(12) United States Patent
Durham et al.

(10) Patent No.: US 7,757,035 B2
(45) Date of Patent: Jul. 13, 2010

(54) METHOD FOR OPTIMIZING VIRTUALIZATION TECHNOLOGY AND MEMORY PROTECTIONS USING PROCESSOR-EXTENSIONS FOR PAGE TABLE AND PAGE DIRECTORY STRIPING

(75) Inventors: David Durham, Hillsboro, OR (US); Hormuzd Khosravi, Portland, OR (US); Gayathri Nagabhushan, Portland, OR (US); Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 11/768,344

(22) Filed: Jun. 26, 2007

(65) Prior Publication Data

US 2009/0006714 A1 Jan. 1, 2009

(51) Int. Cl.
*G06F 21/00* (2006.01)
*G06F 13/00* (2006.01)
*G06F 13/28* (2006.01)
*G06F 9/46* (2006.01)

(52) U.S. Cl. ............................ 711/6; 711/163; 718/104

(58) Field of Classification Search .................. 711/6, 711/163; 718/104
See application file for complete search history.

(56) References Cited

U.S. PATENT DOCUMENTS

| 5,396,614 | A  * | 3/1995  | Khalidi et al. | 711/118 |
| 7,111,145 | B1 * | 9/2006  | Chen et al.    | 711/206 |
| 2006/0026383 | A1 * | 2/2006  | Dinechin et al. | 711/207 |
| 2006/0036830 | A1 * | 2/2006  | Dinechin et al. | 711/200 |
| 2007/0294496 | A1 * | 12/2007 | Goss et al.    | 711/163 |

* cited by examiner

*Primary Examiner*—Matt Kim
*Assistant Examiner*—Michael Alsip
(74) *Attorney, Agent, or Firm*—Blakely, Sokoloff, Taylor & Zafman LLP (57) ABSTRACT

In a virtualized processor based system causing a transition to a virtual machine monitor executing on the processor based system in response to a modification of a page table of a guest executing in a virtual machine of the processor based system, and the virtual machine monitor responding to the transition by performing a verification action, and for each bit modified in the page table of the guest, reading a status indicator for the bit to determine if the bit is significant; and causing the transition only if the status indicator for any bit modified in the page table indicates that the bit is significant.

16 Claims, 4 Drawing Sheets

METHOD FOR OPTIMIZING VIRTUALIZATION TECHNOLOGY AND MEMORY PROTECTIONS USING PROCESSOR-EXTENSIONS FOR PAGE TABLE AND PAGE DIRECTORY STRIPING

BACKGROUND

Among threats to processor based platforms are malicious software "worms", "viruses", "rootkits", "malware". Malicious software propagation combined with the growing intelligence and sophistication of attacks have created a serious threat scenario for corporate and individual property (both intellectual and financial). As software, malicious code is memory-based and therefore, protecting run-time memory from unauthorized accesses has become increasingly important.

Page tables and associated control registers are critical for the functioning of an operating system and applications on many platforms. Therefore, it is important for an unauthorized access or attempt to modify the page tables of a platform by a worm, virus, rootkit, or other malicious entity to be prevented or at least detected.

Some platforms may exist as virtualized machines or virtualized platforms. Virtualization is a technique that enables a processor based host machine with support for virtualization in hardware and software, or in some cases, in software only, to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems provide guest software operating in a virtual machine with a set of resources (e.g., processors, memory, IO devices) and may map some or all of the components of a physical host machine into the virtual machine, or create fully virtual components. The virtualization system may thus be said to provide a virtual bare machine interface to guest software. In some embodiments, virtualization systems may include a virtual machine monitor (VMM) which controls the host machine. The VMM provides guest software operating in a virtual machine (VM) with a set of resources such as processors, memory, and IO devices. The VMM may map some or all of the components of a physical host machine into the virtual machine, and may create fully virtual components, emulated in software in the VMM, which are included in the virtual machine (e.g., virtual IO devices). The VMM uses facilities in a hardware virtualization architecture to provide services to a virtual machine and to provide protection from and between multiple virtual machines executing on the host machine. Generally, the memory space in which the VMM operates is a part of host physical memory that is not accessible to any of the virtual machines operating within guest physical memory of the VM.

Memory protections for guest software executing within a VM are important, and so, similarly, are protections for memory management software for VMs such as page tables and control registers relating to page and memory management in VMs.

DETAILED DESCRIPTION

Figure 1:
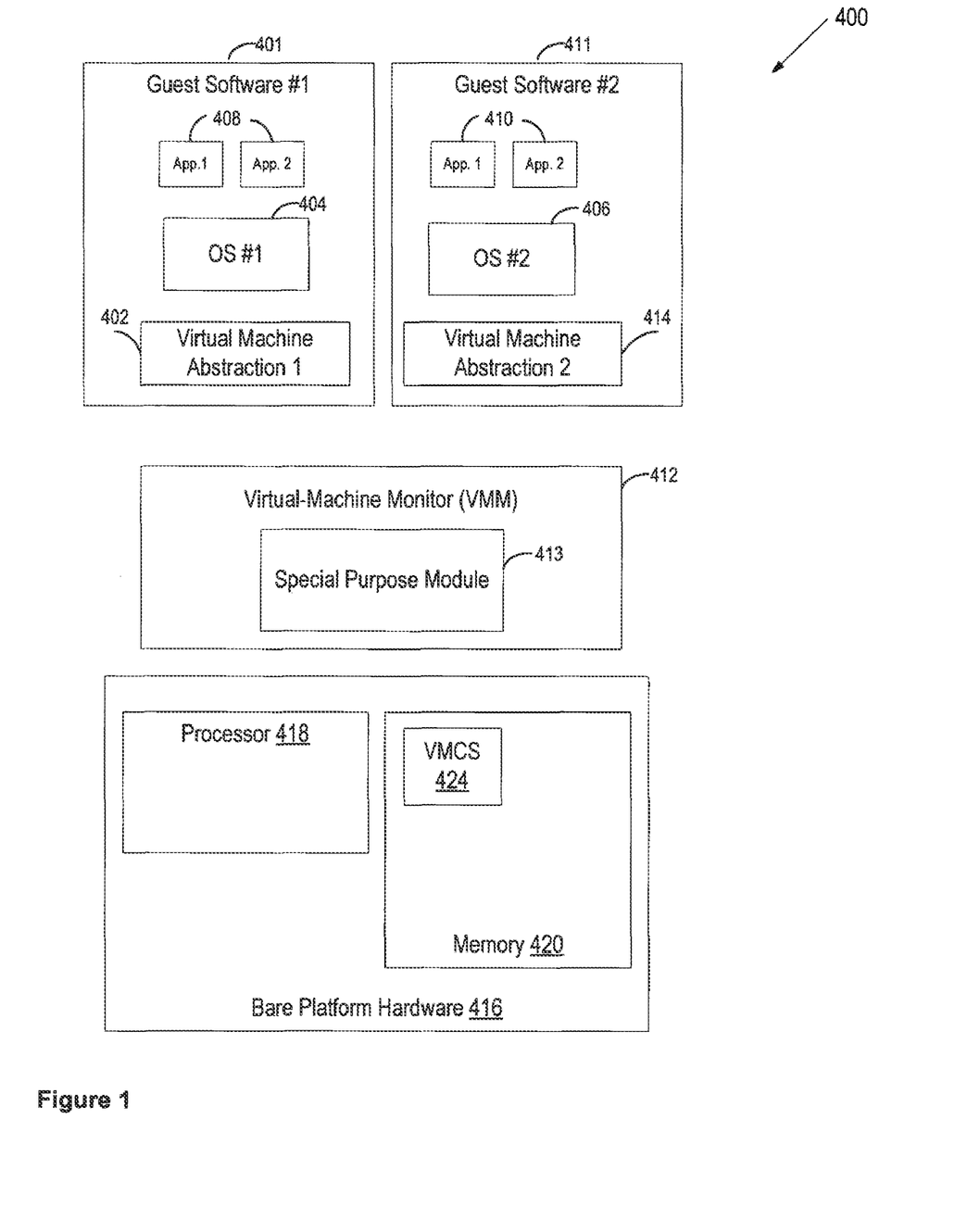
FIG. 1 depicts a virtualized system in one embodiment.

Some embodiments may include virtualization systems. FIG. 1 illustrates one embodiment of a virtual-machine environment 400. In this embodiment, a processor-based platform 416 may execute a VMM 412. The VMM, though typically implemented in software, may emulate and export a virtual bare machine interface to higher level software. Such higher level software may comprise a standard operating system (OS), a real time OS, or may be a stripped-down environment with limited operating system functionality and may not include OS facilities typically available in a standard OS in some embodiments. Alternatively, the VMM may be used to provide additional protections within a single VM, by isolating subcomponents of a single Operating System from one another. Alternatively, for example, the VMM 412 may be run within, or using the services of, another VMM. VMMs may be implemented, for example, in hardware, software, firmware or by a combination of various techniques in some embodiments.

Figure 4:
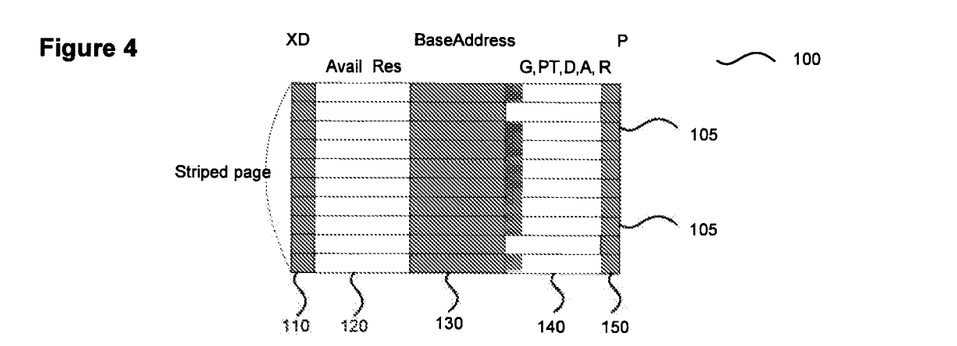
FIG. 4 depicts striping in a page table of an embodiment.

The platform hardware 416 may be a personal computer (PC), mainframe, handheld device such as a personal digital assistant (PDA) or "smart" mobile phone, portable computer, set top box, or another processor-based system. The platform hardware 416 includes at least a processor 418 and memory 420. Processor 418 may be any type of processor capable of executing programs, such as a microprocessor, digital signal processor, microcontroller, or the like. The processor may include microcode, programmable logic or hard coded logic for execution in embodiments. Although FIG. 4 shows only one such processor 418, there may be one or more processors in the system in an embodiment. Additionally, processor 418 may include multiple cores, support for multiple threads, or the like. Memory 420 can comprise a hard disk, a floppy disk, random access memory (RAM), which may be, for example, Dynamic RAM (DRAM), Synchronous DRAM (SDRAM), or one of many other types of RAM, read only memory (ROM), flash memory, any combination of the above devices, or any other type of machine medium readable by processor 418 in various embodiments. Memory 420 may store instructions and/or data for performing program execution and other method embodiments.

The VMM 412 presents to guest software an abstraction of one or more virtual machines, which may provide the same or different abstractions to the various guests. FIG. 4 shows two virtual machines, 402 and 414. Guest software such as guest software 401 and 411 running on each virtual machine may include a guest OS such as a guest OS 404 or 406 and various guest software applications 408 and 410. Guest software 401 and 411 may access physical resources (e.g., processor registers, memory and I/O devices) within the virtual machines on which the guest software 401 and 411 is running and to perform other functions. For example, the guest software 401 and 411 expects to have access to all registers, caches, structures, I/O devices, memory and the like, according to the architecture of the processor and platform presented in the virtual machine 402 and 414.

In one embodiment, the processor 418 controls the operation of the virtual machines 402 and 414 in accordance with data stored in a virtual machine control structure (VMCS) 424. The VMCS 424 is a structure that may contain state of guest software 401 and 411, state of the VMM 412, execution control information indicating how the VMM 412 wishes to control operation of guest software 401 and 411, information controlling transitions between the VMM 412 and a virtual machine, etc. The processor 418 reads information from the VMCS 424 to determine the execution environment of the virtual machine and to constrain its behavior. In one embodiment, the VMCS 424 is stored in memory 420. In some embodiments, multiple VMCS structures are used to support multiple virtual machines.

Resources that can be accessed by guest software (e.g., 401, including guest OS 404 and application 408) may either be classified as "privileged" or "non-privileged." For privileged resources, the VMM 412 facilitates functionality desired by guest software while retaining ultimate control over these privileged resources. Further, each guest software 401 and 411 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be initially handled by the VMM 412 to ensure proper operation of virtual machines 402 and 414 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

As before many variations of the embodiments based on a VMM are possible. The virtual machines shown in FIG. 1 are only one representation of one embodiment, in other embodiments, the actual number of virtual machines executing on a host machine may vary from one to many. Portions of the VMM and the VMCS may be implemented in hardware or in software to different extents in different embodiments. The basic functions provided by the VMM may vary in some embodiments. Each embodiment may define a different set of virtualization events. As previously indicated, the processing described above takes place in an embodiment based on x86 concepts and functionality. However, other embodiments are possible in other architectures that have similar or equivalent functionality.

Memory protections on VT-enabled platforms may be enforced by the VMM. To achieve this, the VMM may maintain shadow page tables, also called Virtual Translation Look-aside buffers (VTLBs), which are synchronized with OS page tables. The algorithms used for this synchronization are called VTLB algorithms. In general they are incremental algorithms that rely on page faults to build the shadow page tables in the VMM. For example, one algorithm flushes all shadow page tables on a context switch in the guest and rebuilds the shadow page tables from scratch after every context switch.

An algorithm in one embodiment uses a scheme in which the guest OS page tables and page directories are made read-only, so that the Virtual Machine Monitor (VMM) may validate all writes to these structures as the guest OS makes modifications to the page tables. With this approach, the VMM may either directly use the OS's page table structure, or may create its own shadow copies and keep them in sync with OS page tables as the OS modifies the page tables (causing page faults due to writes to the page table structures themselves). Since this method eliminates need to walk the entire page table structure on a context switch, it may provide a performance improvement over other proposed algorithms that rebuild shadow page tables after each context switch in the guest. However, frequent writes to the guest page tables by the guest operating system, such as for housekeeping and other purposes may cause a large number of page faults and potentially expensive VMExits, resulting in frequent invocations of the VMM to handle these events. For example, an OS may modify available bits of page table entries with page aging data or other information that does not typically need to be monitored by the VMM, yet the VMM may need to handle each such exception even though the exception may not affect the VMM's shadow copy of the guest page tables.

In some embodiments, a processor optimization to this mechanism known as 'Page Striping' is proposed which may reduce the number of page faults and corresponding VMExits to the VMM generated by the processor, thus improving performance.

In some embodiments, the technique outlined above may also be used in general for the monitoring of guest OS page table changes that can be used by a secure paging method.

Figure 2:
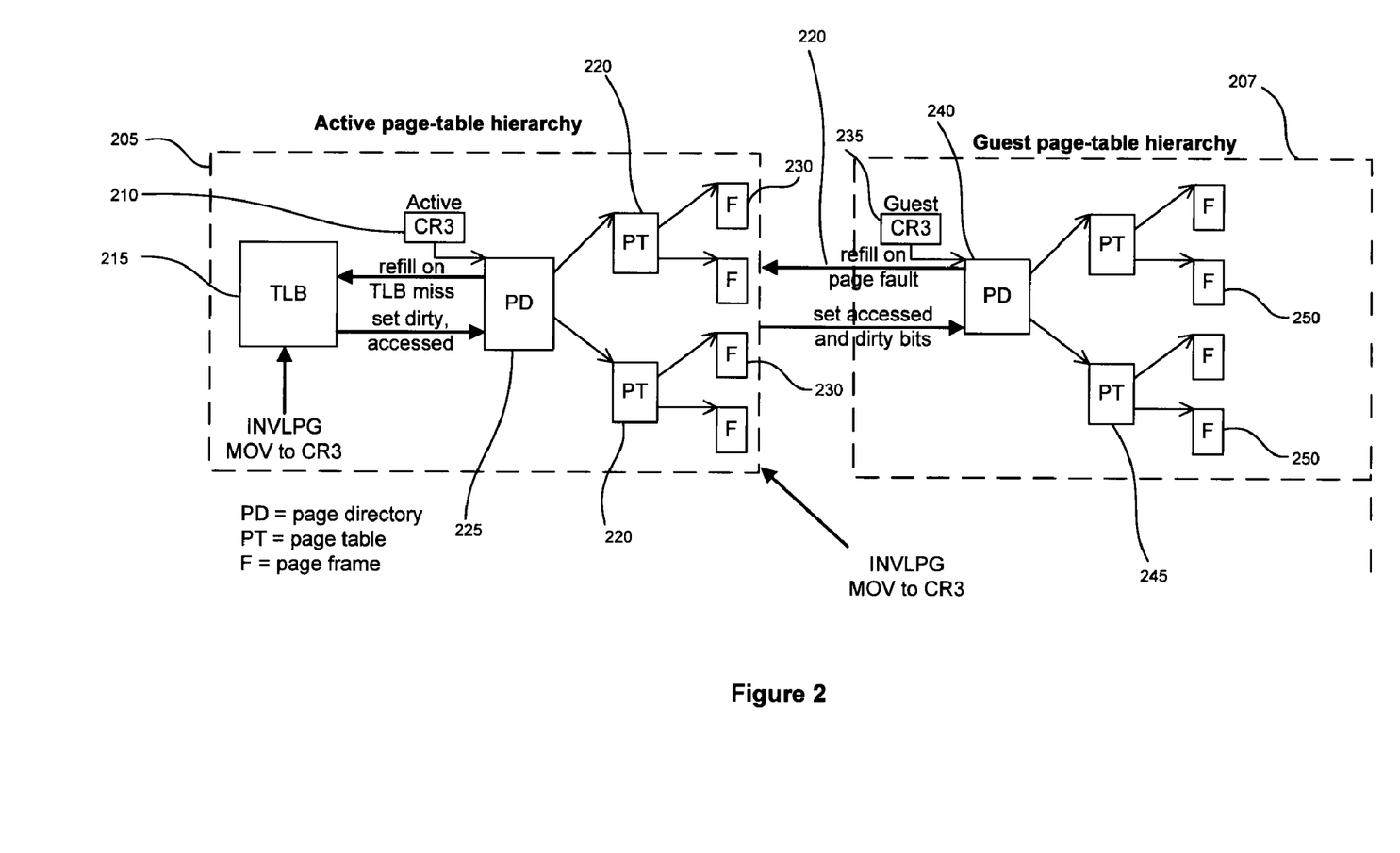
FIG. 2 depicts the logical relationship between guest page tables and shadow page tables in an embodiment

FIG. 2 depicts in general the logical structures involved in one embodiment to synchronize the guest and active (host) page table structures. Box 205 represents the address space and register space of the host, forming the active structure for page management used by the VMM. A control register such as the CR3 register 210 may reference a context represented by a base address of a page directory 225, which in turn references one or more page tables 220. Each page table which may be hierarchical in some embodiments then references page frames 230. Processors in some embodiments may include a Translation Look-aside Buffer (TLB) 215 which may be filled with/recently accessed page descriptors to speed up access to pages. Similarly, the guest has its own page table and page management structures in guest memory and guest machine register space, 207. The guest may have a page table and page directory structure similar to the host in some embodiments, as is shown. Thus, the guest in this embodiment may also have a CR3 register, 235, a page directory 240, page tables 245, and frames 250.

In one algorithm for guest page table management, each page fault in the guest causes a VMExit to the VMM which in turn updates the active page table and associated structures in the host, as is shown at 233.

Figure 3:
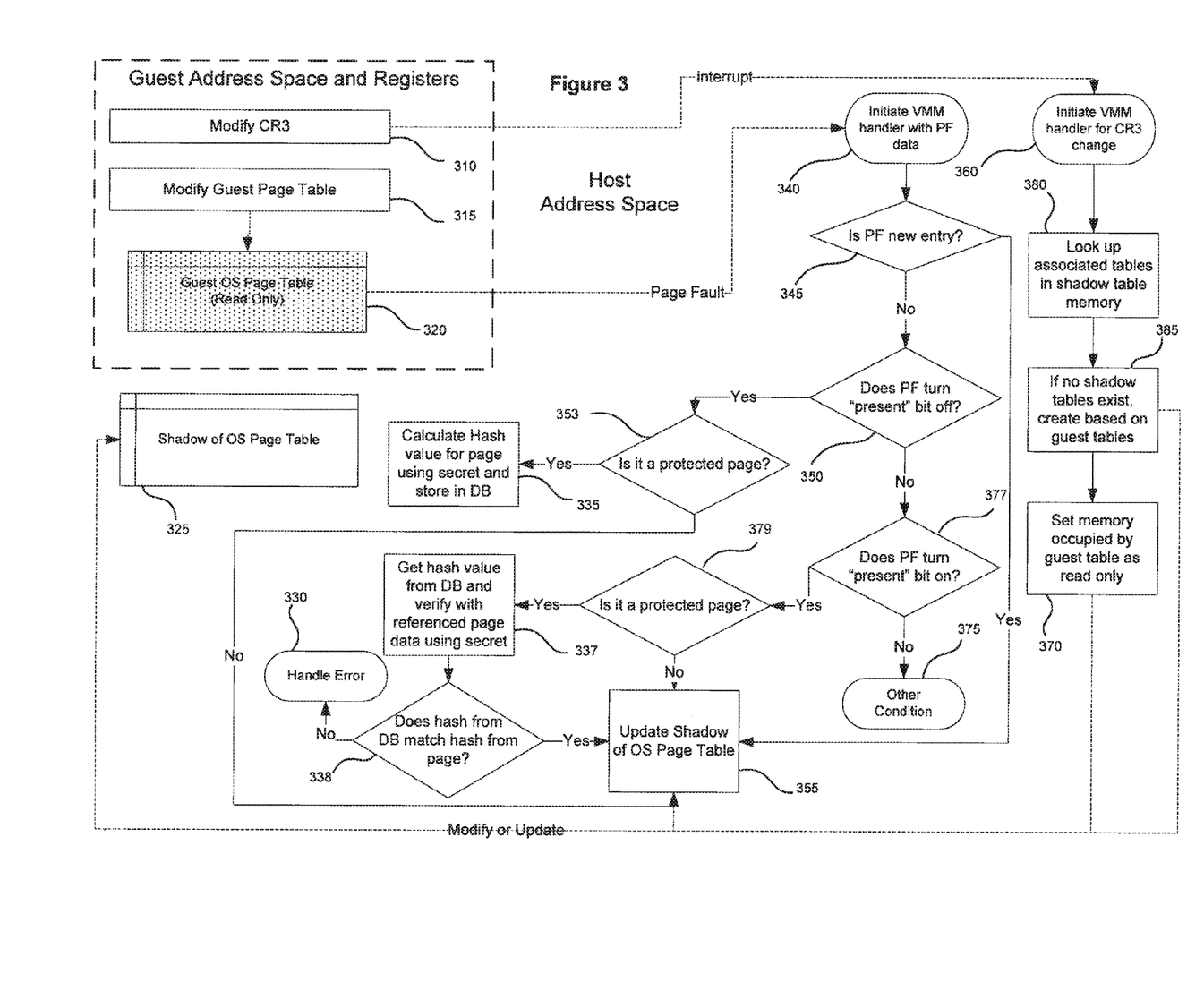
FIG. 3 depicts the flow of processing in one embodiment.

An algorithm for responding to and tracking accesses to guest page tables in an embodiment is shown in FIG. 3. The guest OS page table 320 is set read-only in guest address space as are associated data and control structures such as the control register CR3 in one embodiment. Actions such as modification of the page table, 315, or CR3, 310, then cause an exception, that is, a VMExit or interrupt resulting in a transition to the VMM. Page fault data, if any, is also passed to the handler at 340.

In this embodiment, whenever the OS attempts to change the value of the CR3 registers (using for example, in an x86 instance the MOV CR3 instruction), the processor triggers a VMEXIT (310-360). The VMM executive checks the new value of the CR3 to see if the page directories and page tables pointed to by that CR3 value are already checked and validated, 380. If that indeed is the case, the VMM actually loads the new CR3 value into the processor register, and resumes the VM execution, 385. On the other hand, if this is an entirely new CR3 value that the VMM is seeing for the first time, it performs a page-table walk to validate the page tables (to ensure that the page tables do not contain any illegal memory mappings or permissions), also 385. If the page tables are validated without any errors, the VMM marks these new page tables as well as all other monitored page tables to make these newly discovered page tables read-only to the guest in the VM, loads the new CR3 value into the processor register, and resumes the VM execution, 370.

Further this algorithm may in some embodiments also facilitate monitoring for secure paging, i.e. securely swapping pages in and out of memory (transfer of pages from memory to disk and back). Page faults may be used to monitor pages being swapped in and out of memory, calculate their hashes making sure of their integrity before they are copied back into host memory. A page fault triggers a VMEXIT and initiates the handler at 340. If the page fault is due to a new entry, 345, the algorithm merely updates the shadow page table. Otherwise, the two main phases on verifying the integrity of swapped out pages involve calculating the hash on the way out to the disk and re-calculating the hash on swapping-in the page back to main memory. The OS updates the page table bits from present to not-present when the page is being swapped out of main memory. If the present bit is turned off (i.e. not-present), 350, and if it is a protected page, 353 the handler calculates the hash on this page and stores it in a database (DB), 335. Later when the page is needed back in main memory, the OS fetches this page from the disk and sets the page table bit to be present. On detecting this condition, 377, the handler would trigger a DB hash check 337 and 338 to verify that the page has not been modified on the disk if it is protected, 379. This mechanism enables secure page swapping. This may be useful in providing security and integrity services like for extending memory firewall or intra-partitioning support for un-pinned pages in memory.

It should however be noted that the algorithm generally depicted in FIG. 3 may be implemented without the VMM making complete copies of the page tables. In an alternate embodiment, the VMM could simply mark the Page Table Entries (PTEs) and Page Descriptor Entries (PDEs) that correspond to page tables as read only in the OS page-tables directly. Thus, whenever the OS attempts to modify these page tables, it would cause a page fault, and consequently a VMEXIT, allowing the VMM to validate the modification. For example, in embodiment systems running Microsoft Windows®, this can be achieved by making all the PDEs in the VM address range where Windows maps the page tables read-only It should also be noted that future revisions of x86 processors will support Address Source IDentifiers (ASIDs) and CR3 Target Lists that will associate the TLB entries with different CR3 values. This optimization will help X86 processors optimize TLBs by not having to flush the TLBs on every CR3 change (Currently, all TLB entries need to be flushed on a CR3 change, since the translations provided by those entries become invalid. With ASIDs, the processor can determine which entries are valid in the current context, and hence there is no need to flush the entire TLB). The presence of CR3 Target List and ASIDs can also be used to optimize the FIG. 3 algorithm as follows. On a CR3 change, the processor checks the CR3 Target List for an entry with the new CR3 value and the TLB to see if an entry in the TLB has an ASID corresponding to the new CR3 value. If there is such an entry, it implies that the new CR3 value has been encountered in the past, and hence page directories and tables corresponding to this value have been validated by the VMM. In this case, the processor does not trigger a VMEXIT, and proceeds with loading the CR3 value directly without invoking the VMM. However, if no ASID corresponding to the new CR3 value is found in the TLB, then the new CR3 value might correspond to an entirely new page-table structure. And thus, the processor triggers a VMEXIT, allowing the VMM to check if the CR3 value represents new set of page tables, and if so, validate the page tables (path at 360). This optimization can reduce the number of VMEXITs due to CR3 changes significantly.

While the above embodiments have been described with reference to an x86 or x86-like architecture, it should be apparent to those in the art that the above may easily be extended to other architectures that support virtualization and page table management, such as a MIPS, SPARC, or Power architecture. While x86 specific details such as the CR3 register may not be provided in such other architectures, equivalent mechanisms may easily be substituted as would be apparent to the artisan.

A typical OS makes periodic changes to the page table structures. For example, sophisticated memory manages use available bits in the page table to keep track of aging. Such bits need to be updated very frequently. If the processor in the above described embodiments were to cause a VMEXIT on every such update, the performance of the above described algorithm may be severely hampered. To address this issue, some embodiments introduce the concept of "page striping."

Page Striping is a processor enhancement which helps reduce the number of page faults and/or corresponding VMExits on the system. It essentially introduces the concept of striping certain bits on pages (based on a stripe bit mask) so that a processor page fault would occur only if those bits on the pages were modified. For example, in case of a page table, if the Present/Not Present bits were striped for the pages containing the page table, only changes to those bits could possibly cause a page fault. Any modification of the state of other bits such as Dirty and Access bits etc would not cause a page fault. This mechanism can improve performance of a shadow page table update algorithm, by striping the page table pages themselves. In embodiments, such as depicted in FIG. 4, the memory associated with storing a page is striped if the striping bit in the page table is enabled. Striping modifies the behavior of the processor when accessing a memory word on a striped page, 100 as shown in FIG. 4. Each word e.g. 105 in the page is divided into bit-fields called stripes, such as 110, 120, 130, 140, and 150. Generally, there are two types of stripes. In this instance, in the x86 page table structure the "execute disable" or XD field, the base address of the page, 130, and the "present" or P field are striped in one way, to indicate "significance" and the other bits in each page table entry are striped in the other way to indicate "non-significance" in accordance with the bitmask.

Figure 5:
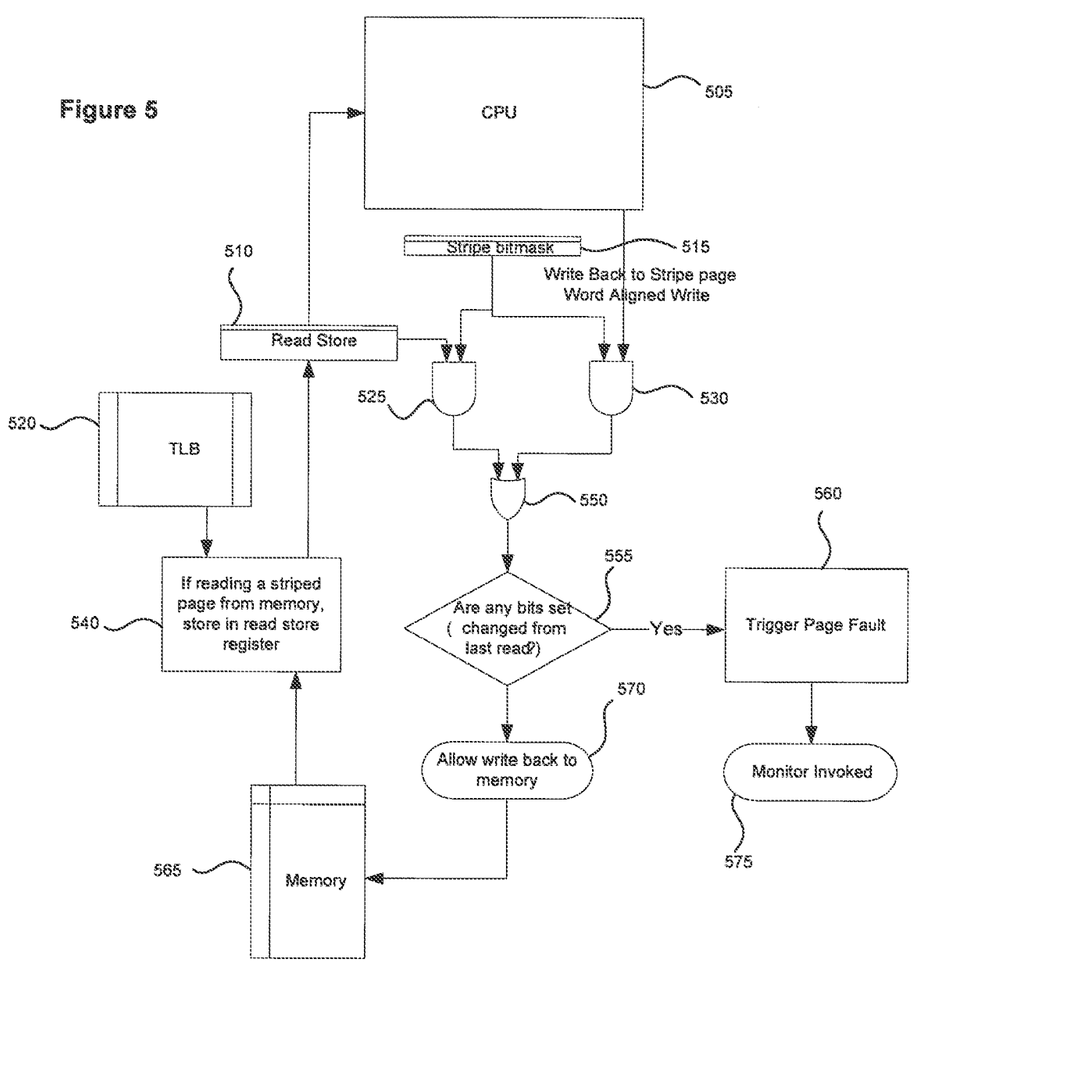
FIG. 5 depicts operation of striped page table monitoring in one embodiment.

FIG. 5 indicates how striped page tables may be implemented and processed in this embodiment. A page is marked as a striped page in the TLB 520. Because different pages may have different striping patterns, a striped bitmask is associated with the page in the page table control structure that is loaded into the TLB. This striping bit mask when loaded into a processor register 515, instructs the processor 505 as to which bits in a striped page are significant (e.g. in this embodiment, a bit-mask value of 1 indicates the bit is significant, while a bit-mask value of 0 indicates that the bit is insignificant). In the above page table depicted in FIG. 4, the bit fields 110, 130 and 150 are significant (see FIG. 4). Logic 525, 530 and 550 is used to determine if a bit being written in the page table is significant. All the writes to a striped page that do not modify any significant bits on the striped page are also allowed to proceed without any page faults. However, if a write to a striped page results in modification of significant bits on the striped page, it triggers a page fault. This is accomplished as follows: If the bit is significant, and the processor is writing a value different from the last value in that bit, 555, the processor triggers a fault 560 and a VMEXIT 575. Otherwise the logic allows a write back to memory 565 without an expensive invocation of the VMM, 570. The processor allows all reads to a striped page to proceed without any errors.

To enable the check at 555, the logic also stores any striped pages that are read from memory at 540 to detect non-modifying writes.

Striping may be applied at a bit level across a page or a particular section of a page using a bit mask, or by using a repeating pattern bitmask applied periodically across the page or a section of the page, or alternatively across several overlapping or non overlapping sections of a page. Striping may be applied bit by bit using a bitmask, or word by word, or for every other word, or for every N words (for some fixed number N) in a page or for every N significant words for those words marked as significant, or any combination of the above.

The above algorithms can further be optimized by monitoring or controlling the page directory structures instead of maintaining multiple page table level structures. For example intra-partitioning can be provided by aligning all the pages belonging to a particular agent, driver, process, library, kernel module or other software component into page directory and control permissions at this level.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
   striping a portion of a page, associated with a guest application executing on a virtualized processor based system, to enable page fault only if the page having that striped portion is modified;
   assigning a stripe bit-mask to indicate which bits in the striped portion of the page are significant;
   causing a transition to a virtual machine monitor (VMM) executing on the virtualized processor based system in response to an attempt to modify a page of guest application;
   determining whether the attempt to modify the page results in modification of the significant bits;

triggering a page fault only if the significant bits are modified; and cancelling the transition to the VMM if the significant bits remain the same.

2. The method of claim 1, wherein the attempt to modify the page of the guest application further comprises:

attempting to modify at least one of a page table entry of the guest application and a page table descriptor of the guest application.

3. A method of claim 1, wherein the attempt to modify the page of the guest application further comprises:

attempting to modify a register referencing a base address of a page of the guest application.

4. The method of claim 1, wherein causing the transition to the VMM further comprises:

setting an indication to indicate that an area of memory including a page table is read-only; and causing the transition to the VMM if an attempt is made to write to the area of memory subsequent to the setting of the indication.

5. A machine readable medium having stored thereon data that when accessed by a machine causes the machine to perform a method, the method comprising:

striping a portion of a page, associated with a guest application executing on a virtualized processor based system, to enable paste fault only if the page having that striped portion is modified;

assigning a stripe bit-mask to indicate which bits in the striped portion of the page are significant;

causing a transition to a virtual machine monitor (VMM) executing on the virtualized processor based system in response to an attempt to modify a page of guest application;

determining whether the attempt to modify the page results in modification of the significant bits;

triggering a page fault only if the significant bits are modified; and cancelling the transition to the VMM if the significant bits remain the same.

6. A processor based system comprising:

a memory;

a storage; and a processor communicatively coupled with the memory and the storage by at least a bus, the processor having logic to perform a method comprising:

striping a portion of a page, associated with a guest application executing on the processor based system, to enable page fault only if the page having that striped portion is modified;

assigning a stripe bit-mask to indicate which bits in the striped portion of the page are significant;

causing a transition to a virtual machine monitor (VMM) executing on the processor in response to an attempt to modify a page of the guest application;

determining whether the attempt to modify the page results in modification of the significant bits;

triggering a page fault only if the significant bits are modified; and cancelling the transition to the VMM if the significant bits remain the same.

7. The processor based system of claim 6, wherein the attempt to modify the page of the guest application further comprises the logic to perform a method including:

attempting to modify at least one of a page table entry of the guest and a page descriptor of the guest application.

8. The processor based system of claim 6, wherein the attempt to modify the page of the guest application further comprises the logic to perform a method including:

attempting to modify a register referencing a base address of the page of the guest application.

9. The method of claim 1 further comprising:

validating mappings, by the VMM, of a page table associated with the page in response to the triggering; and synchronizing a shadow table with the page table of the guest application in response to validating mappings of the page table.

10. The method of claim 9, wherein validating mappings further comprises:

ensuring integrity of the page by comparing a hash of the contents of the page to a previously stored hash.

11. The machine readable medium of claim 5 having stored thereon data that when accessed by the machine causes the machine to further perform a method, the method comprising:

validating mappings, by the VMM, of a page table associated with the page in response to the triggering; and synchronizing a shadow table with the page table of the guest application in response to validating mappings of the page table.

12. The machine readable medium of claim 11, wherein validating mappings further comprises:

ensuring integrity of the page by comparing a hash of the contents of the page to a previously stored hash.

13. The machine readable medium of claim 5, wherein causing the transition to the VMM further comprises:

setting an indication to indicate that an area of memory including a page table is read-only; and causing the transition to the VMM if an attempt is made to write to the area of memory subsequent to the setting of the indication.

14. The system of claim 6, wherein the logic to further perform a method comprising:

validating mappings, by the VMM, of a page table associated with the page in response to the triggering; and synchronizing a shadow table with the page table of the guest application in response to validating mappings of the page table.

15. The system of claim 14, wherein validating mappings further comprises:

ensuring integrity of the page by comparing a hash of the contents of the page to a previously stored hash.

16. The system of claim 6, wherein causing the transition to the VMM further comprises:

setting an indication to indicate that an area of memory including a page table is read-only; and causing the transition to the VMM if an attempt is made to write to the area of memory subsequent to the setting of the indication.

* * * * *

UNITED STATES PATENT AND TRADEMARK OFFICE
CERTIFICATE OF CORRECTION

| | | |
|---|---|---|
| PATENT NO. | : 7,757,035 B2 | |
| APPLICATION NO. | : 11/768344 | |
| DATED | : July 13, 2010 | |
| INVENTOR(S) | : Durham et al. | |

It is certified that error appears in the above-identified patent and that said Letters Patent is hereby corrected as shown below:

In column 9, at line 26 delete, "paste" and insert --page--.

Signed and Sealed this
Eleventh Day of January, 2011

David J. Kappos
*Director of the United States Patent and Trademark Office*